Patented June 8, 1948

2,443,141

UNITED STATES PATENT OFFICE 2,443,141

REMOVAL OF METAL HALIDE FROM FLUIDS

John W. Latchum, Jr., Bartlesville, Okla., assignor to Phillips Petroleum Company, a corporation of Delaware No Drawing. Application December 10, 1945,
Serial No. 634,152

8 Claims. (Cl. 260—683.5)

This invention relates to the removal of metal halides from fluids. In one preferred embodiment it relates to the adsorption of sublimed aluminum chloride or other Friedel-Crafts type metal halide catalyst from the vaporous effluents of a catalytic hydrocarbon conversion process. It is particularly useful in the treatment of vaporous organic materials containing relatively small but significant quantities of both a metal halide and a hydrogen halide, whereby the former is completely removed from the organic material without substantial removal of the latter.

Catalysts such as the halides of aluminum, beryllium, boron, zinc, titanium, tin, zirconium, iron, antimony, and other polyvalent metal halides, generally known as Friedel-Crafts type metal halides, have been used in carrying out various organic conversions; the isomerization of paraffin and cycloparaffin hydrocarbons, the alkylation of paraffins, the alkylation of aromatic hydrocarbons, the cracking of hydrocarbons, the polymerization of olefins, the disproportionation of hydrocarbons, the reaction of phenols with tertiary alkyl halides or alcohols, may be mentioned as examples. In many such conversions, considerable difficulty has been encountered due to the volatilization or solution of catalysts in vaporous or liquid reaction mixtures whereby catalyst is carried out of the reaction zone by the effluent products. This carry-over gives rise to corrosion, fouling, and plugging of subsequent portions of the equipment, necessitating plant shutdowns or provision of duplicate equipment to avoid shutdowns. Numerous efforts have been made to overcome such difficulties, in which a variety of methods have been employed with more or less success.

One of the most effective and generally used methods, particularly in treating vaporous effluents, is to pass the same immediately upon leaving the catalyst into contact with a body of a solid adsorbent material. This is preferably done without substantial change in temperature or pressure conditions. The adsorbent may be in a separate chamber, known as a "guard chamber," or may be in the same chamber as the catalyst and on the downstream side of the catalyst. The relatively small amounts of metal halide, such as aluminum chloride, are adsorbed by the solid adsorbent and the remaining vapors comprising the product of the conversion are recovered more or less free from the metal halide. Quite a number of adsorbents have been suggested for this purpose, particularly "activated alumina." A commercially available calcined bauxite known as "Porocel" has been used in many commercial butane isomerization plants for the purpose of adsorbing sublimed aluminum chloride from catalyst chamber effluents.

While such methods have proved to be commercially successful, there are certain drawbacks pointing to definite needs for improvement. One of these, of course, is the fact that the adsorbent can be used for only a limited period of time before it loses its efficiency and fails to provide complete removal of the aluminum chloride. Another serious difficulty resides in the fact that the anhydrous hydrogen chloride or other hydrogen halide, which is ordinarily used as activator for the metal halide catalyst, and which is therefore present in the conversion effluents, is likewise adsorbed to a substantial extent. This represents an appreciable loss of hydrogen chloride which must be replaced, and when a fresh adsorbent is first placed on-stream in the "guard chamber" a deficiency in the hydrogen chloride which is normally recycled to the reaction chamber is caused which is reflected in decreased conversion.

It is accordingly an object of my invention to provide an improved method of removing metal halide from fluids.

Another object is to remove vaporized aluminum chloride from a gas containing the same together with hydrogen chloride.

A further object is to provide an improved solid adsorbent for metal halides of the Friedel-Crafts type.

Yet another object is to pre-treat a solid adsorbent which is used to adsorb sublimed aluminum chloride from hydrogen chloride-containing butane isomerization effluents, in such a manner that the capacity of the adsorbent for aluminum chloride is increased while its capacity to adsorb hydrogen chloride is decreased.

A still further object is to use an alkali-treated pumice as an adsorbent for metal halides.

Further objects and advantages of this invention will be apparent, to one skilled in the art, from the accompanying disclosure and discussion.

For the purpose of adsorbing metal halides as described hereinabove, pumice has been considered to be distinctly inferior to various other adsorbents. I have discovered quite unexpectedly that by subjecting pumice to a pre-treatment with an alkaline liquid followed by drying, the pumice is greatly improved in its ability to adsorb aluminum chloride, for example, from vapors. A concomitant and surprising effect is that the capacity of the pumice to adsorb hydrogen halide from vapors is actually decreased. Not only is pumice pre-treated in this manner superior to untreated pumice, but it is likewise comparable to or in some instances appreciably better than other recognized and widely used adsorbents, as will appear from the data given in the example below. A similar type of pre-treatment may also be used in accordance with this invention for various known adsorbents other than pumice, by which analogous, though not necessarily equivalent, results are obtained.

A preferred method of treatment involves soaking the pumice or other adsorbent in a dilute aqueous alkaline solution. For example, soaking a low-iron-content pumice overnight in a 2% solution of sodium hydroxide in water improves the properties of the pumice for the purposes of this invention. Other alkali metal hydroxides, such as potassium hydroxide, or alkaline earth metal hydroxides, such as barium or calcium hydroxides, may likewise be used if desired, although ordinary caustic is quite satisfactory and is more advantageous from an economic standpoint. Ordinarily used is a dilute caustic solution having a NaOH concentration in the range of about 1 to 10% by weight, and preferably 1 to 5%. Solutions of less than 1% may be used with correspondingly longer soaking periods. The treatment of the pumice with the alkaline liquid may be done in any known manner; for instance, the liquid may be sprayed on the surface of the pumice. However, it is preferred that the pumice be allowed to contact the alkaline material for a substantial length of time, such as for at least several hours, prior to drying.

The thus-treated pumice is next dried at a moderate temperature. Inasmuch as pumice contains very little chemically combined water and what water it does pick up by adsorption is readily released, I find it unnecessary to dry the pumice at a temperature appreciably above the boiling point of water. Drying at 200° F. is quite satisfactory, although temperatures up to 300° F. or somewhat higher may be used to decrease the drying time.

It may be mentioned here that it is unnecessary to dry the pumice before the pre-treatment. This contrasts with the other adsorbents which are ordinarily used, such as bauxite, which must be heated to high temperatures of the order of 900 to 1200° F. for substantial periods of time in order to drive off most or all of the water of hydration if a highly activated adsorbent is to be obtained. Thus the use of pumice pre-treated in accordance with the present invention avoids the drying costs heretofore encountered. Pumice is likewise appreciably cheaper than the bauxite or activated alumina which have heretofore been employed.

When the pumice has been pre-treated and dried as described, it is ready for use in the guard chamber of an isomerization plant, or to remove metal halides from fluids encountered in other processes. In the case of the isomerization plant, a normal butane stream containing a minor portion of anhydrous hydrogen chloride as catalyst activator is preferably vaporized and passed in contact with a body of aluminum chloride catalyst. The catalyst may be in any of the many known forms, one which is commercially used being "Porocel" impregnated with aluminum chloride. The isomerization temperature may range from 200° F. up to about 350° F. At such temperatures a small but important amount of aluminum chloride sublimes from the catalyst and is carried out in the hot vaporous isobutane-containing effluents. In a preferred modification of the present invention, such hot effluents are immediately contacted with a body of pumice pretreated as already described above. It is ordinarily most convenient to provide a body of pumice particles through which the vapors are passed, although any other method of contacting, such as suspension of powdered pumice in the vapors, may be used to obtain the same result. The pre-treated pumice adsorbs substantially all the aluminum chloride from the vapors and yet adsorbs practically no hydrogen chloride. Since the isomerization effluents are condensed and the condensate fractionated to recover isobutane product, unconverted normal butane which is recycled to the catalyst for further conversion, and hydrogen chloride which is also recycled to the catalyst, the non-adsorption of hydrogen chloride by the pre-treated pumice is of considerable advantage.

In order to illustrate one preferred modification of the invention and the improved results obtained thereby, the following data are presented. It will, of course, be understood that these data are not to be construed as unduly limiting the scope of the invention.

Example

In conjunction with a commercial butane isomerization plant, a series of pilot tests was run to determine the efficacy of untreated and treated pumice for use as "guard chamber" adsorbents. Two small test chambers were provided. A portion of the effluents from the large commercial catalyst chamber was split, and the resulting streams were led through the two chambers at the same flow rates, and at substantially the conditions prevailing in the catalyst chamber.

A sample of the pumice to be used for these tests was heated to 900° F. and subjected to conventional chemical analysis:

|  | Per cent by weight |
|---|---|
| Silica ($SiO_2$) | 76.00 |
| Aluminum oxide ($Al_2O_3$) | 14.71 |
| Iron oxide ($Fe_2O_3$) | 1.10 |
| Calcium oxide (CaO) | .89 |
| Magnesium oxide (MgO) | 2.26 |
| Loss on ignition | 1.70 |
| Loss undetermined [1] | 3.34 |
|  | 100.0 |

[1] May be sodium and potassium.

For one test, pumice was used without treatment. For another test, pumice was pre-treated by soaking in a water solution containing 1.9 weight per cent NaOH, followed by drying at 200° F. The treated and untreated batches of pumice were compared with samples of "Porocel" (a commercially available low-iron-content bauxite) previously calcined at 900° F.

After each run, the used adsorbents were removed and analyzed for $AlCl_3$ and HCl, with the following results:

|  | $AlCl_3$, per cent by weight | HCl, per cent by weight |
|---|---|---|
| RUN A | | |
| Porocel | 7.35 | 5.25 |
| Untreated Pumice | 5.58 | 4.04 |
| RUN B | | |
| Porocel | 7.41 | 3.15 |
| Treated Pumice | 12.38 | 0.05 |

These data clearly show the superiority of the pre-treated pumice over both the untreated pumice and the "Porocell."

In an attempt to explain these results, a sample of the pre-treated pumice was analyzed for alkalinity by leaching with water, the leachings then being titrated with N/10 $H_2SO_4$, using both phenolphthalein and methyl orange as indicators. A sample of the untreated pumice was also tested.

| | cc. N/10 Acid Required by Leachings from 1 gram Pumice | | |
|---|---|---|---|
| | Phenol-phthalein | Methyl Orange | Total |
| Untreated Pumice | 0 | .486 | .486 |
| Treated Pumice | .645 | 1.230 | 1.875 |

*Increase in total alkalinity by soaking in 1.9% NaOH*

$$1.875 - 0.486 = 1.389$$

Taking an extreme view, and calculating all of the total alkalinity of the pre-treated pumice as NaOH, the weight per cent $AlCl_3$ which would be picked up by pumice containing that quantity of NaOH was calculated, based on the equation $$AlCl_3 + 4NaOH \rightarrow 3NaCl + NaAlO_2 + 2H_2O$$

From these data and assumptions, it was calculated that if the pre-treated pumice picked up only $AlCl_3$ equivalent to its caustic content, only 0.625 weight per cent $AlCl_3$ would be picked up. It is thus obvious that the efficacy of the pre-treatment is not due merely to mechanical inclusion in the adsorbent of a chemical reactant for the aluminum chloride.

I claim:

1. In a process for the isomerization of normal butane which comprises passing a gaseous mixture of normal butane and a catalyst-activating amount of hydrogen chloride in contact with an aluminum chloride catalyst at isomerization conditions forming an effluent gaseous mixture of normal butane, isobutane, hydrogen chloride, and sublimed aluminum chloride, and recovering hydrogen chloride from said effluent mixture and recycling same to contact with said catalyst, the improvement which comprises passing the said effluent gaseous mixture without substantial change in conditions into contact with a body of pumice pretreated by soaking in an aqueous 2 per cent sodium hydroxide solution followed by drying at 200° F., whereby said sublimed aluminum chloride is substantially adsorbed by said pretreated pumice without substantial adsorption of said hydrogen chloride.

2. The method of removing a Friedel-Crafts type metal halide from a mixture of organic vapors and hydrogen halide vapors which comprises passing said vaporous mixture through pumice pretreated as described hereinbelow, and separating from said pumice a metal halide-free mixture of organic vapors and hydrogen halide vapors, said pumice being pretreated by contacting same with an aqueous solution of a metal hydroxide chosen from the group consisting of the alkali metal hydroxides and the alkaline earth metal hydroxides followed by drying.

3. The method of claim 2, in which said metal halide is an aluminum halide.

4. The method of claim 2, in which said metal halide is a metal chloride, and said hydrogen halide is hydrogen chloride.

5. A process for selectively removing a vaporous metal halide from a gas containing same in minor amount together with a hydrogen halide in minor amount, which comprises contacting said gas with pumice impregnated with an alkali metal hydroxide without deliberate cooling of said gas prior to or during said contact with said impregnated pumice.

6. In a process for effecting organic reactions in the vapor phase with the aid of an anhydrous aluminum chloride catalyst activated with anhydrous hydrogen chloride which comprises passing a reaction mixture comprising an organic material and hydrogen chloride in contact with the catalyst and immediately thereafter under substantially the same conditions with a pumice adsorbent whereby aluminum chloride vapors are substantially adsorbed from the reaction mixture, and recovering hydrogen chloride therefrom and recycling same to contact with the catalyst, the method of increasing the capacity of said adsorbent for adsorbing aluminum chloride and decreasing its capacity for adsorbing hydrogen chloride which comprises pretreating said pumice adsorbent by first soaking same in a dilute aqueous solution of sodium hydroxide and then drying the thus-soaked adsorbent prior to using same in the aforesaid process.

7. The process of claim 6 in which said adsorbent is a low-iron-content pumice.

8. A process for selectively removing a vaporous Friedel-Crafts type metal halide from a gas containing same in minor amount together with a hydrogen halide in minor amount, which comprises contacting said gas with pumice impregnated with a metal hydroxide chosen from the group consisting of the alkali metal hydroxides and the alkaline earth metal hydroxides to effect adsorption of said metal halide, and recovering the resulting hydrogen halide-containing gas.

JOHN W. LATCHUM, JR.

REFERENCES CITED

The following references are of record in the file of this patent:

UNITED STATES PATENTS

| Number | Name | Date |
|---|---|---|
| 2,281,924 | DeSimo et al. | May 5, 1942 |
| 2,313,661 | Montgomery | Mar. 9, 1943 |
| 2,324,746 | Weinrich et al. | July 20, 1943 |
| 2,403,181 | Jones | July 2, 1946 |